UNITED STATES PATENT OFFICE.

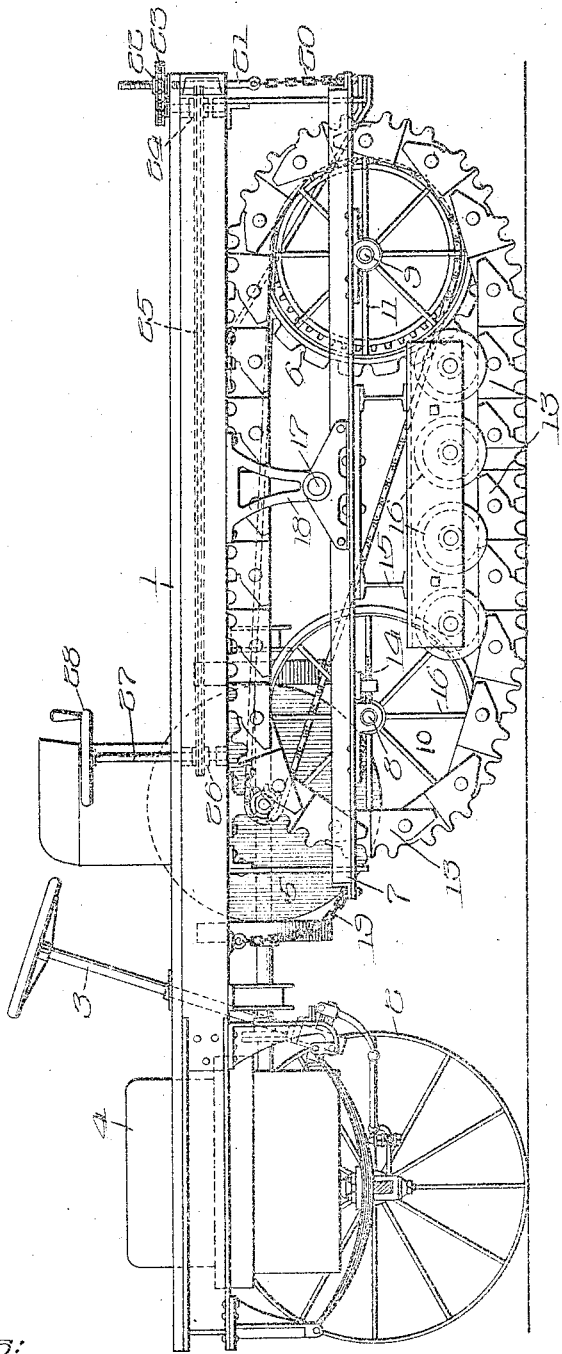

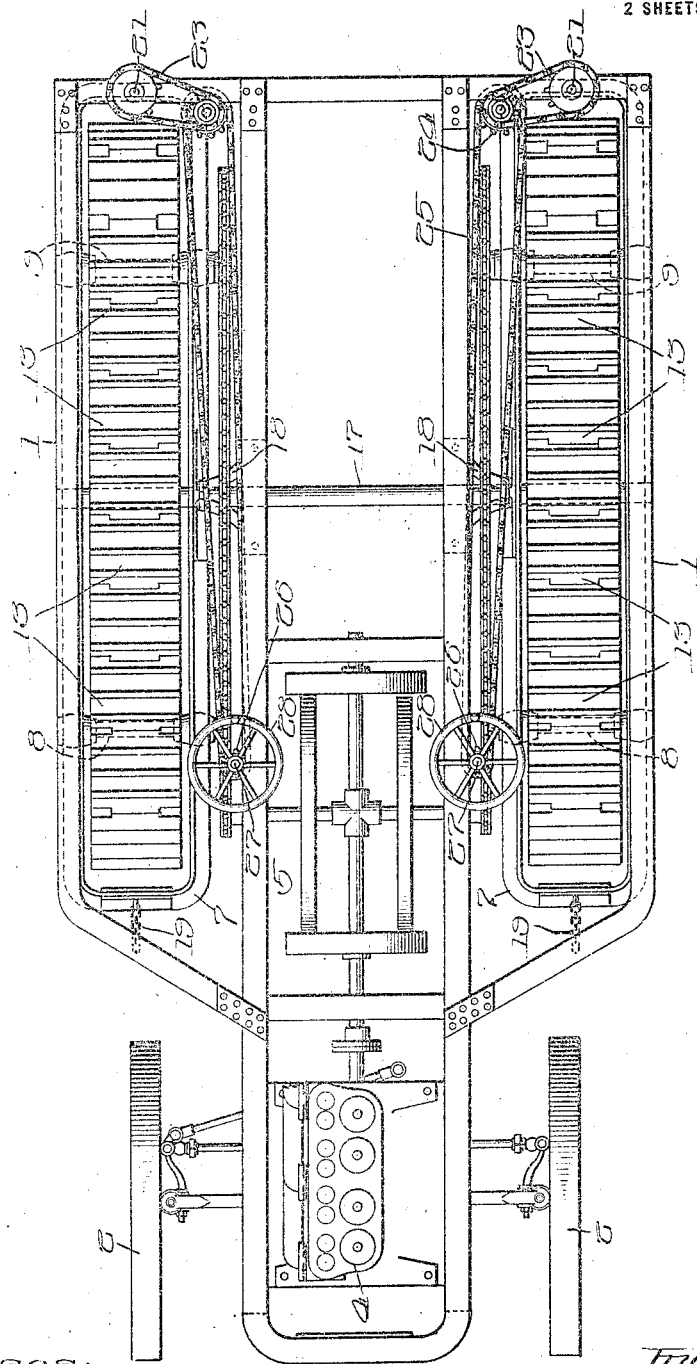

JOHN O. MORRIS, OF DAVENPORT, IOWA, ASSIGNOR, BY MESNE ASSIGNMENTS, TO BULLOCK TRACTOR COMPANY, OF CHICAGO, ILLINOIS, A CORPORATION OF ILLINOIS.

VEHICLE.

1,142,196. Specification of Letters Patent. Patented June 8, 1915.

Application filed February 7, 1912. Serial No. 676,022.

*To all whom it may concern:*

Be it known that I, JOHN O. MORRIS, citizen of the United States, residing at Davenport, in the county of Scott and State of Iowa, have invented a certain new and useful Improvement in Vehicles, of which the following is a full, clear, concise, and exact description, reference being had to the accompanying drawings, forming a part of this specification.

My invention relates to vehicles of that class which employ endless tracks carried by the vehicles and upon which wheels of the vehicles travel.

My invention has for one of its objects the provision of an improved mounting for such tracks whereby they may be automatically adapted to rises and falls on the ground over which the vehicle is passing.

My invention has for another of its objects the provision of improved means for arbitrarily adjusting the positions of the tracks so that the tracks may be adapted either to the normal travel of the vehicle or may be adjusted to enable the vehicle to turn.

Both objects of my invention are realized in a vehicle which includes two tracks, one upon each side of the vehicle, and which tracks are in the form of chains which are driven by driving sprocket wheels located at the rear of the chains, these sprocket wheels having rims which are interposed between the chain stretches while tension wheels are provided at the forward ends of the chains, these tension wheels also having rims that are interposed between the chain stretches. Each chain is desirably provided with a truck frame individual thereto, these truck frames carrying bearings for the wheels that are individual to such chain. This truck frame is oscillatingly mounted with respect to the body of the vehicle, the mounting being desirably located between the wheels. Each chain travels in an elongated orbit so as to have extended engagement with the ground when the vehicle is traveling in straight or substantially straight paths. By oscillatingly mounting the chain tracks through the intermediation of their truck frames, the elongated lower stretches of the chains will readily adapt themselves to the varying undulations of the ground surface over which the vehicle passes, the engagement of the chain with the ground thus substantially imposing no varying load upon the track driving mechanism since there is no relative motion between the tracks and the ground portions that are actually in engagement with the tracks, a characteristic which is enhanced by so constructing the track chains as to prevent slippage between the same and the ground. Owing to the extended contact of the tracks with the ground not only longitudinally of the tracks but desirably also transversely thereof, a maximum amount of friction is occasioned between the tracks and the ground when it is endeavored to turn the vehicle from its straight line of travel were it not for the swinging mounting which I have provided for the tracks and the provision of supplemental mechanism coöperating with the swinging mounting whereby the tracks may be bodily adjusted so as to be angularly disposed with respect to the ground whereby the area of contact of the tracks with the ground is reduced in order to enable the vehicle to be deflected from its course. I do not limit myself to a vehicle having all the characteristics above outlined.

I will explain my invention more fully by reference to the accompanying drawings showing the preferred embodiment thereof and in which—

Figure 1 is a side elevation of a vehicle as it is preferably constructed in accordance with one embodiment of the invention and Fig. 2 is a plan view of the structure as it appears in Fig. 1.

Like parts are indicated by similar characters of reference throughout the different figures.

The general type of vehicle illustrated is well known by those skilled in the art. The vehicle illustrated includes a vehicle body 1 supported at its forward end by steering wheels 2 which roll directly upon the ground and whose planes of rotation are adjustable by means of well known steering mechanism 3 in order to determine the direction of travel of the vehicle. I have illustrated a hydrocarbon engine 4 and transmission mechanism 5 for the purpose of driving the sprocket wheels 6 for the purpose of effecting the propulsion of the vehicle but as this transmission mechanism and the relation thereof with the sprocket wheels 6 form no novel part of my present invention, I will not fully describe the same.

I have employed truck frames 7, one upon each side of the vehicle, these truck frames carrying bearings 8 and 9 for the tension and driving wheels 10 and 11. These wheels tread upon the endless tracks 13 in a manner that will be readily understood, the endless tracks 13 being preferably constructed as set forth in my co-pending application Serial No. 676,021, filed Feb. 7, 1912. Each tension wheel 10 is adapted to have its distance from the corresponding driving sprocket wheel 11 adjustably maintained by a tension adjusting device 14 for the purpose of maintaining the endless track belonging to these wheels sufficiently taut. Each truck frame 7 is also provided with a carrier 15 in which a plurality of rollers 16 are mounted, these rollers being employed for engaging the upper side of the lower stretch of the associate endless track to maintain the portion of the track between the wheels 10 and 11 sufficiently level so as to prevent the track from unduly conforming with the irregularities in the surface of the ground over which the vehicle is moving and to limit the extent to which the lower stretches of the tracks may be upwardly flexed.

Each truck frame 7 is provided with a mounting shaft 17 carried by hangers 18, the elements 17 and 18 being preferably located substantially midway between the wheel bearings 8 and 9. The truck frame 7 is normally free to oscillate so that either end may be raised or lowered from the horizontal position in which the axes of the wheels 10 and 11 are included as illustrated in Fig. 1, chains 19 and 20 being preferably employed for defining the range of oscillation of the truck frame. In Fig. 1 the chain 20 is shown as being taut, this condition of the chain 20 being brought about when the track chain is to be bodily adjusted preparatory to turning the vehicle. Normally the chain 20 is slack as is the chain 19. The links that compose each track chain desirably have their external surfaces of gripping or holding formation whereby the portion of the track chain resting upon the ground may have firm non-slipping engagement with the ground. The lower ground engaging portion of the tracks are desirably prevented from being raised above the same plane by means of the rollers 16, but in order to permit these portions of the tracks to adapt themselves generally to changing slopes of the ground the swinging mounting structures 17 and 18 are employed, the truck frames 7, the wheels 10 and 11 carried thereby, as well as the endless tracks being bodily adjusted automatically by the ground as the inclination of the ground varies, the endless tracks and the coöperating parts bodily adjusted therewith being automatically adjusted with respect to the ground without having their coöperative relationship disturbed.

When it is desired to turn the vehicle from its straight line course an appreciable degree, I desirably depress the forward ends of the truck frames 7, a result which is preferably accomplished by exerting lifting action upon the rear of the truck frames through the intermediation of the chains 20. To this end the chains 20, which are secured at their lower ends to the truck frames 7, are attached at their upper ends to the non-rotating shafts 21 whose upper ends are threaded and have threaded engagement with sprocket wheels 22 which rotate in planes that are fixed with respect to the vehicle body 1. The sprocket wheels 22 are directly driven by sprocket chains 23 that in turn are driven by sprocket pinions 24. These sprocket pinions 24 are driven by sprocket chains 25 that in turn are driven by sprocket pinions 26 fixedly mounted upon the shafts 27 of hand operated wheels 28. By the mechanism just described the turning of the wheels 28 in one direction will cause the shafts 21 to rise without rotating whereby the rear ends of the truck frames 7 are elevated and the forward ends of said truck frames are depressed so that the forward portions of the lower stretches of the endless tracks will alone rest upon the ground so that the course of the vehicle may be changed without the obstructing action which otherwise arises if the rear portions of the lower stretches of the endless tracks were not elevated. After the vehicle has been turned the wheels 28 are reversed in their rotation so that the chains 19 and 20 may both be restored to their normal slack condition.

Structures including the rollers 16 not only serve to prevent the upward flexure of the endless tracks but also coöperate with the rollers or wheels 16 at the forward ends of the tracks to define substantially definite points at which the tracks are confined to engagement with the ground when the tracks are elevated, this characteristic being of especial advantage when the rear of the truck frames are tilted then effectively to enable the vehicle to make a sharp turn.

While I have herein shown and particularly described the preferred embodiment of my invention I do not wish to be limited to the precise details of construction shown as changes may readily be made without departing from the spirit of the invention.

Having thus described my invention I claim as new and desire to secure by Letters Patent the following:—

A vehicle including a vehicle body; endless tracks, formed of links, upon which wheels of the vehicle may turn; two wheels for each track and about which such track passes; truck frames upon which are mounted the wheels about which each track passes; structures for opposing the upward flexure of the lower stretches of the tracks and comprising a plurality of rollers carried by the truck frames; and means for raising and maintaining elevated the rear ends of the truck frames and the rollers mounted thereupon whereby the forward portions of the tracks may alone rest upon the ground preparatory to changing the direction of travel of the vehicle, said structures coöperating with the forward track wheels in defining substantially definite points at which the tracks are confined to engagement with the ground when the tracks are tilted.

In witness whereof, I hereunto subscribe my name this fifth day of February, A. D. 1912.

JOHN O. MORRIS.

Witnesses:
  E. L. WHITE,
  G. L. CRAGG.